(12) United States Patent
Manikutty et al.

(10) Patent No.: US 7,685,150 B2
(45) Date of Patent: Mar. 23, 2010

(54) OPTIMIZATION OF QUERIES OVER XML VIEWS THAT ARE BASED ON UNION ALL OPERATORS

(75) Inventors: Anand Manikutty, Foster City, CA (US); Muralidhar Krishnaprasad, Fremont, CA (US); Zhen Hua Liu, San Mateo, CA (US); Vikas Arora, San Francisco, CA (US); James W. Warner, Mountain View, CA (US); Rohan Angrish, Redwood City, CA (US); Hui Zhang, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 804 days.

(21) Appl. No.: 11/237,286

(22) Filed: Sep. 27, 2005

(65) Prior Publication Data

US 2006/0235840 A1     Oct. 19, 2006

Related U.S. Application Data

(60) Provisional application No. 60/673,311, filed on Apr. 19, 2005.

(51) Int. Cl.
*G06F 17/30* (2006.01)
(52) U.S. Cl. .................................................... 707/102
(58) Field of Classification Search ............... 707/1–10, 707/100–104.1, 200–206
See application file for complete search history.

(56) References Cited

U.S. PATENT DOCUMENTS 5,404,513 A    4/1995    Powers et al.

(Continued)

FOREIGN PATENT DOCUMENTS

EP          1 241 589 A2      9/2002

(Continued)

OTHER PUBLICATIONS

Banerjee, Sandeepan et al., "Oracle8*i*—The XML Enabled Data Management System"—Oracle Corporation, Mar. 2000, IEEE, pp. 561-568.

(Continued)

*Primary Examiner*—Diane Mizrahi
(74) *Attorney, Agent, or Firm*—Hickman Palermo Truong & Becker LLP; Eric L. Sutton

(57) ABSTRACT

Optimization is provided for database statements involving XML data, e.g., XPath and XQuery, which operate over views that use aggregate set operators, e.g., UNION ALL. As part of a "view merge" stage of query transformation, the query that operates over the view is merged with a query that defines the view. One or more expressions (e.g., operators, predicates, virtual table constructs) from the query that operates over the view are then "pushed down" to operate on the individual underlying XML data constructs. "Branch elimination" is performed based on the structure of the view and the query acting over the view, based on which it is possible to determine whether any of the sub-queries, if executed, would result in the return of zero rows. If so, then such branches are eliminated from the transformed query, leaving a reduced set of data containers on which to execute the query.

38 Claims, 2 Drawing Sheets

U.S. PATENT DOCUMENTS

| | | | |
|---|---|---|---|
| 5,680,614 | A | 10/1997 | Bakuya et al. |
| 5,717,911 | A | 2/1998 | Madrid et al. |
| 5,878,415 | A | 3/1999 | Olds |
| 5,897,632 | A | 4/1999 | Dar et al. |
| 5,950,188 | A * | 9/1999 | Wildermuth ................ 707/3 |
| 5,974,407 | A | 10/1999 | Sacks |
| 5,987,506 | A | 11/1999 | Carter et al. |
| 5,999,941 | A | 12/1999 | Andersen |
| 6,012,067 | A | 1/2000 | Sarkar |
| 6,038,563 | A | 3/2000 | Bapat et al. |
| 6,055,544 | A | 4/2000 | DeRose et al. |
| 6,061,684 | A | 5/2000 | Glasser et al. |
| 6,128,610 | A | 10/2000 | Srinivasan et al. |
| 6,141,655 | A | 10/2000 | Johnson et al. |
| 6,154,741 | A | 11/2000 | Feldman |
| 6,199,195 | B1 | 3/2001 | Goodwin et al. |
| 6,208,993 | B1 | 3/2001 | Shadmon |
| 6,236,988 | B1 | 5/2001 | Aldred |
| 6,240,407 | B1 | 5/2001 | Chang et al. |
| 6,263,332 | B1 | 7/2001 | Nasr et al. |
| 6,269,380 | B1 | 7/2001 | Terry et al. |
| 6,279,006 | B1 | 8/2001 | Shigemi et al. |
| 6,298,349 | B1 | 10/2001 | Toyoshima et al. |
| 6,343,287 | B1 | 1/2002 | Kumar et al. |
| 6,356,887 | B1 | 3/2002 | Berenson et al. |
| 6,356,889 | B1 | 3/2002 | Lohman et al. |
| 6,356,920 | B1 | 3/2002 | Vandersluis |
| 6,366,934 | B1 | 4/2002 | Cheng et al. |
| 6,370,537 | B1 | 4/2002 | Gilbert et al. |
| 6,418,448 | B1 | 7/2002 | Sarkar |
| 6,438,540 | B2 | 8/2002 | Nasr et al. |
| 6,449,620 | B1 | 9/2002 | Draper et al. |
| 6,470,344 | B1 | 10/2002 | Kothuri et al. |
| 6,487,546 | B1 | 11/2002 | Witkowski |
| 6,496,842 | B1 | 12/2002 | Lyness |
| 6,536,889 | B1 | 3/2003 | Biegelsen et al. |
| 6,584,459 | B1 | 6/2003 | Chang et al. |
| 6,604,100 | B1 | 8/2003 | Fernandez et al. |
| 6,615,203 | B1 | 9/2003 | Lin et al. |
| 6,636,845 | B2 | 10/2003 | Chau et al. |
| 6,643,633 | B2 | 11/2003 | Chau et al. |
| 6,708,186 | B1 | 3/2004 | Claborn et al. |
| 6,725,212 | B2 | 4/2004 | Couch et al. |
| 6,772,350 | B1 | 8/2004 | Belani et al. |
| 6,785,673 | B1 | 8/2004 | Fernandez et al. |
| 6,836,778 | B2 | 12/2004 | Manikutty et al. |
| 7,013,311 | B2 | 3/2006 | Hui et al. |
| 7,031,956 | B1 | 4/2006 | Lee et al. |
| 7,099,858 | B2 | 8/2006 | Aldrich et al. |
| 7,120,645 | B2 | 10/2006 | Manikutty et al. |
| 7,167,848 | B2 | 1/2007 | Boulkouvalas et al. |
| 7,315,852 | B2 | 1/2008 | Balmin et al. |
| 7,359,922 | B2 | 4/2008 | Young-Lai et al. |
| 7,386,568 | B2 | 6/2008 | Warner et al. |
| 2001/0037345 | A1 | 11/2001 | Kiernan et al. |
| 2002/0007375 | A1 | 1/2002 | Ebata |
| 2002/0015042 | A1 | 2/2002 | Robotham et al. |
| 2002/0038358 | A1 | 3/2002 | Sweatt, III et al. |
| 2002/0056025 | A1 | 5/2002 | Qiu et al. |
| 2002/0073019 | A1 | 6/2002 | Deaton |
| 2002/0116371 | A1 | 8/2002 | Dodds et al. |
| 2002/0116457 | A1 | 8/2002 | Eshleman et al. |
| 2002/0120685 | A1 | 8/2002 | Srivastava et al. |
| 2002/0124100 | A1 | 9/2002 | Adams |
| 2002/0133484 | A1 | 9/2002 | Chau et al. |
| 2002/0133497 | A1 | 9/2002 | Draper et al. |
| 2002/0169788 | A1 | 11/2002 | Lee et al. |
| 2002/0184401 | A1 | 12/2002 | Kadel, Jr. et al. |
| 2002/0198874 | A1 | 12/2002 | Nasr et al. |
| 2003/0004937 | A1 | 1/2003 | Salmenkaita et al. |
| 2003/0009361 | A1 | 1/2003 | Hancock et al. |
| 2003/0014397 | A1 | 1/2003 | Chau et al. |
| 2003/0065659 | A1 | 4/2003 | Agarwal et al. |
| 2003/0093672 | A1 | 5/2003 | Cichowlas |
| 2003/0097383 | A1 * | 5/2003 | Smirnov et al. ............ 707/204 |
| 2003/0101194 | A1 | 5/2003 | Rys et al. |
| 2003/0115548 | A1 * | 6/2003 | Melgar ..................... 715/513 |
| 2003/0140308 | A1 | 7/2003 | Murthy et al. |
| 2003/0158897 | A1 | 8/2003 | Ben-Natan et al. |
| 2003/0182624 | A1 | 9/2003 | Large |
| 2004/0043758 | A1 | 3/2004 | Sorvari et al. |
| 2004/0064466 | A1 | 4/2004 | Manikutty et al. |
| 2004/0088415 | A1 | 5/2004 | Chandrasekar et al. |
| 2004/0093344 | A1 | 5/2004 | Berger et al. |
| 2004/0148278 | A1 | 7/2004 | Milo et al. |
| 2004/0176958 | A1 | 9/2004 | Salmenkaita et al. |
| 2004/0220912 | A1 | 11/2004 | Manikutty et al. |
| 2004/0220927 | A1 | 11/2004 | Murthy et al. |
| 2004/0225680 | A1 | 11/2004 | Cameron et al. |
| 2004/0230667 | A1 | 11/2004 | Wookey |
| 2004/0243555 | A1 | 12/2004 | Bolsius et al. |
| 2004/0267760 | A1 | 12/2004 | Brundage et al. |
| 2005/0010896 | A1 | 1/2005 | Meliksetian et al. |
| 2005/0065949 | A1 | 3/2005 | Warner et al. |
| 2005/0097084 | A1 | 5/2005 | Balmin et al. |
| 2005/0120029 | A1 | 6/2005 | Tomic et al. |
| 2005/0228791 | A1 | 10/2005 | Thusoo et al. |
| 2005/0289125 | A1 | 12/2005 | Liu et al. |
| 2006/0101011 | A1 | 5/2006 | Lindsay et al. |

FOREIGN PATENT DOCUMENTS

| | | |
|---|---|---|
| WO | WO 00/49533 A2 | 8/2000 |
| WO | WO 01/42881 A2 | 6/2001 |
| WO | WO 01/59602 A1 | 8/2001 |
| WO | WO 01/61566 A1 | 8/2001 |

OTHER PUBLICATIONS

Banerjee, Sandeepan et al., "XML Query (XQuery) Support in Oracle Database 10g Release 2," An Oracle White Paper, May 2005, 43 pages.

Bohannon, Philip et al. "From XML Schema to Relations: A Cost-Based Approach to XML Storage"—Bell Laboratories, IEEE—2002—Proceedings of the 18th International Conference on Data Engineering (ICDE '02), pp. 1-28.

Bourret, R. et al.: A generic Load/Extract Utility for Data Transfer Between XML Documents and Relational Databases, Jun. 8-9, 2000, IEEE computing SOC., pp. 134-143.

Braga, Daniele et al., "A Graphical Environment to Query XML Data with Query," Proceedings of the Fourth International Conference on Web Information Systems Engineering (WISE '03), 2003, IEEE, 10 pages.

Buxton, Stephen et al., "Query XML," An Oracle White Paper, Dec. 2004, 29 pages.

Chae, Mi-Ok, et al., "Design and Implementation of an Object-Oriented Multimedia DBMS Tightly Coupled with Information Retrieval Functions," Proc. 17th IASTED International Conference on Applied Informatics, Feb. 15-18, 1999, abstract.

Chen, Ruey-Shun et al., "Developing an XML framework for metadata system", Trinity College Dublin, Proc. of the 1st Inter. Sympo. on Information and Communication, pp. 267-272.

Cheng, Josephine et al., "IBM DB2 XML Extender, An end-to-end solution for storing and retrieving XML documents." IEEE, ICDE '00 Conference, San Diego, Feb. 2000, 128 pages.

Clark, James et al., "XM Path Language (XPath) Version 1.0," W3C Recommendation, Nov. 16, 1999, located on the internet at http://w3.org/TR/xpath, retrieved on Nov. 6, 2006, 22 pages.

Dayen, I., "Storing XML in Relational Databases", XML.com, XP-002275971(1998-2004), pp. 1-13.

Funderbunk, J. et al., "XML programming with SQL/XML and XQuery", *IBM Systems Journal*, XP-002295973 (2002), pp. 642-665.

Gennick, Jonathan, "XQuery Flowers," Oracle network, as Published in Oracle Magazine, Sep./Oct. 2005, 6 pages.

Hierarchical Queries, XP-002295972, pp. 8-3 to 8-7.

Jajodia, Sushil, et al., "Toward a Multilevel Secure Relational Data Model," ACM, 1991, 8393 SIGMOD Record, Jun. 20 1991, No. 2, New York, US, XP 000364619, pp. 50-59.

Khan, Latifur et al., "Performance Evaluation of Storing XML Data in Relational Database Management Systems", ACM-2001 (pp. 31-38).

Krishnaprasad, Muralidhar et al., "Query Rewrite for XML in Oracle XML DB," Proceeding of the 30$^{th}$ VLDB Conference, 2004, 12 pages.

Kvitka, Carline, "XQuery: A New Way to Search," Oracle Technology Network, As Published in Oracle Magazine, Jan./Feb. 2005, 2 pages.

Lee, Geoff, "Mastering XML DB Queries in Oracle Database 10g Release 2," An Oracle White Paper, Mar. 2005, 17 pages.

Lee, Geoff et al., "XQuery Support in Oracle Database 1g Release 2," PowerPoint Presentation, 59 pages.

Liu, Zhen Hua, et al., "Native XQuery Processing in Oracle XMLDB," 8 pages.

Manolescu, Dragos, Review of "Metadata solutions: using metamodels, repositories, XML, and enterprise portals to generate information on demand by Adrienne Tannenbaum", Mar. 2003, ACM Press, vol. 28, Issue 2, p. 38.

Melton, Jim, "ISO-ANSI Working Draft, XML-Related Specifications (SQL/XML)," WG3: DRS-020, H2-2002-365, Aug. 2002, 154 pages.

Noser, Hansrudi et al. "Dynamic #D Visualization of Database-Defined Tree Structures on WWW by Using Rewriting Systems," 2000, IEEE, XP-002262516, pp. 247-254.

Oracle Corporation, "Oracle9*i* XML Database Developer's Guide—Oracle XML DB," Release 2 (9.2), Mar. 2002, Part No. A96620-1, pp. 5-8—5-10, 5-21—5-24, 5-52—5-70, 10-5—10-20 and 11-1—11-20.

Oracle Corporation, "Oracle9*i* XML Database Developer's Guide—Oracle XML DB," Release 2 (9.2), Mar. 2002, Part No. A96620-1, pp. 10-1 to 10-54.

Oracle Corporation, "XML Query (XQuery) Support in Oracle Database 10G Release 2," Oracle Data Sheet, Jul. 2005, 3 pages.

Peng, Feng et al., "XPath queries on streaming data", 2003, ACM Press, pp. 431-442.

Ramakrishnan, Ragu et al. "SRQL: Sorted Relational Query Language", Jul. 1-3, 1998, IEEE, pp. 84-95.

Shanmugasundaram, Jayavel, et al., "Querying XML Views of Relational Data," Proceedings of the 27$^{th}$ Very Large Databases Conference, Rome, Italy, Sep. 2001, pp. 261-270.

Vion-Dury, Jean-Yves, "XPath on left and right sides of rules: toward compact XML tree rewriting through node patterns", 2003, ACM Press, pp. 19-25.

Vorthmann, Scott, et al., "Beyond Schemas, Schema Adjuncts and the Outside World," Markup Languages, Online!, vol. 2, No. 3, Jun. 2000, pp. 1-8.

W3C, "XML Schema Part 1: Structures," W3C Recommendation, May 2, 2001, retrieved from the internet: http://www.w3.org/TR/2001/REC-xmlschema-1-20010502/, retrieved on Apr. 14, 2005, pp. 1-186.

W3C, "XML Schema Part 2: Datatypes," W3C Recommendation, May 2, 2001, retrieved from the internet: http://www.w3.org/TR/2001/REC-xmlschema-2-20010502/, retrieved on Apr. 14, 2005, pp. 1-138.

W3C, "XQuery 1.0: An XML Query Language," W3C Recommendation, Working Draft, Oct. 29, 2004, retrieved from the internet:<http://www.w3.org/TR/2004/WD-xquery-20041029>, retrieved on Apr. 14, 2005, pp. 1-189.

International Preliminary Examination Report, Application No. PCT/US03/35551, Oct. 8, 2004, pp. 1-17.

Written Opinion, Application No. PCT/US03/35551, Nov. 10, 2004, 6 pages.

Current claims in PCT/US03/35551, pp. 1-4.

International Searching Authority, "Notification of Transmittal of the International Search Report and the Written Opinion of the International Authority, or the Declaration," Nov. 2, 2004, PCT/US2004/010018, 14 pages.

PCT/US2004/010018—current claims, 10 pgs.

International Preliminary Examination Report, Application No. PCT/US02/30783, Apr. 1, 2004, 15 pages.

Current claims in PCT/US02/30783, pp. 1-8.

* cited by examiner

OPTIMIZATION OF QUERIES OVER XML VIEWS THAT ARE BASED ON UNION ALL OPERATORS

CROSS-REFERENCE TO RELATED APPLICATIONS

This application is related to and claims the benefit of priority to U.S. Provisional Patent Application No. 60/673,311 filed on Apr. 19, 2005, entitled "Elimination-Based Optimization of XML Queries Over XML Views Using Aggregation Operators"; the entire contents of which is incorporated by this reference for all purposes as if fully disclosed herein.

This application is related to U.S. patent application Ser. No. 10/428,878 filed on May 1, 2003, entitled "Techniques For Rewriting XML Queries Directed to Relational Database Constructs", and is related to U.S. patent application Ser. No. 10/984,471 filed Nov. 8, 2004, entitled "Techniques For Partial Rewrite of XPATH Queries In A Relational Database", the entire contents of both of which are incorporated by this reference for all purposes as if fully disclosed herein. These two applications are referred to herein as the "Query Rewrite" references.

FIELD OF THE INVENTION

The present invention relates generally to data management and, more specifically, for managing execution of database queries of XML data views that are based on the UNION ALL operator.

BACKGROUND

The Extensible Markup Language (XML) is commonly used for publishing and sharing structured and semi-structured data over the World Wide Web. XPath and XQuery are query languages for querying XML data. XML data in relational, object-relational and object databases may range from highly structured to highly unstructured. The structure of stored XML data may be known at compile time, according to various storage models. Such models include the following:

XML Schema-conformant XML: the XML data in the tables may conform to an XML Schema document. The structure of the XML data is provided by the XML Schema document.

XML operator view: the XML data may be generated from relational data stored in tables, using XML generation operators. The structure of the XML data is provided by the structure of the XML generation operators, such as XML element (e.g., XMLElement) and XML aggregate (e.g., XMLAgg) operators.

XML-ized object view: the XML data may be generated by converting object-relational and object data to XML. The structure of the XML data is provided by the structure of the objects.

Opaque XML data: the XML data may be XML natively stored in an opaque format in the database. The structure of the XML data may be provided by auxiliary type information stored with the XML data instance.

XQuery-based data: the XML data may be generated as a result of the evaluation of an XQuery expression, such as the result of the XMLTable construct or the XMLQuery( ) function. The structure of the XML data may be provided by type information stored with the XML.

User-defined XML generation: the XML data may be generated as a result of user-defined and/or native functions. The structure of the XML data may be given by type information returned by the function.

Repository data: the XML data may be generated from the repository. The structure of the XML data may be given by one of the above schemes, along with type information based on the repository, such as hierarchical information.

Additionally, the structure of the XML data may be known at compile-time based on various other schemes. The structure of the XML data may also be given by a combination of one or more of the above schemes, as well as by a combination of zero or more of the above schemes along with one of various other schemes used to structure XML data.

Because of the widespread use of XML data, evolution of XML schemas to which XML data conforms, and the diverse storage models available for XML data, there is room for improvement in efficiently executing XML queries.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS OF THE INVENTION

Figure 1:
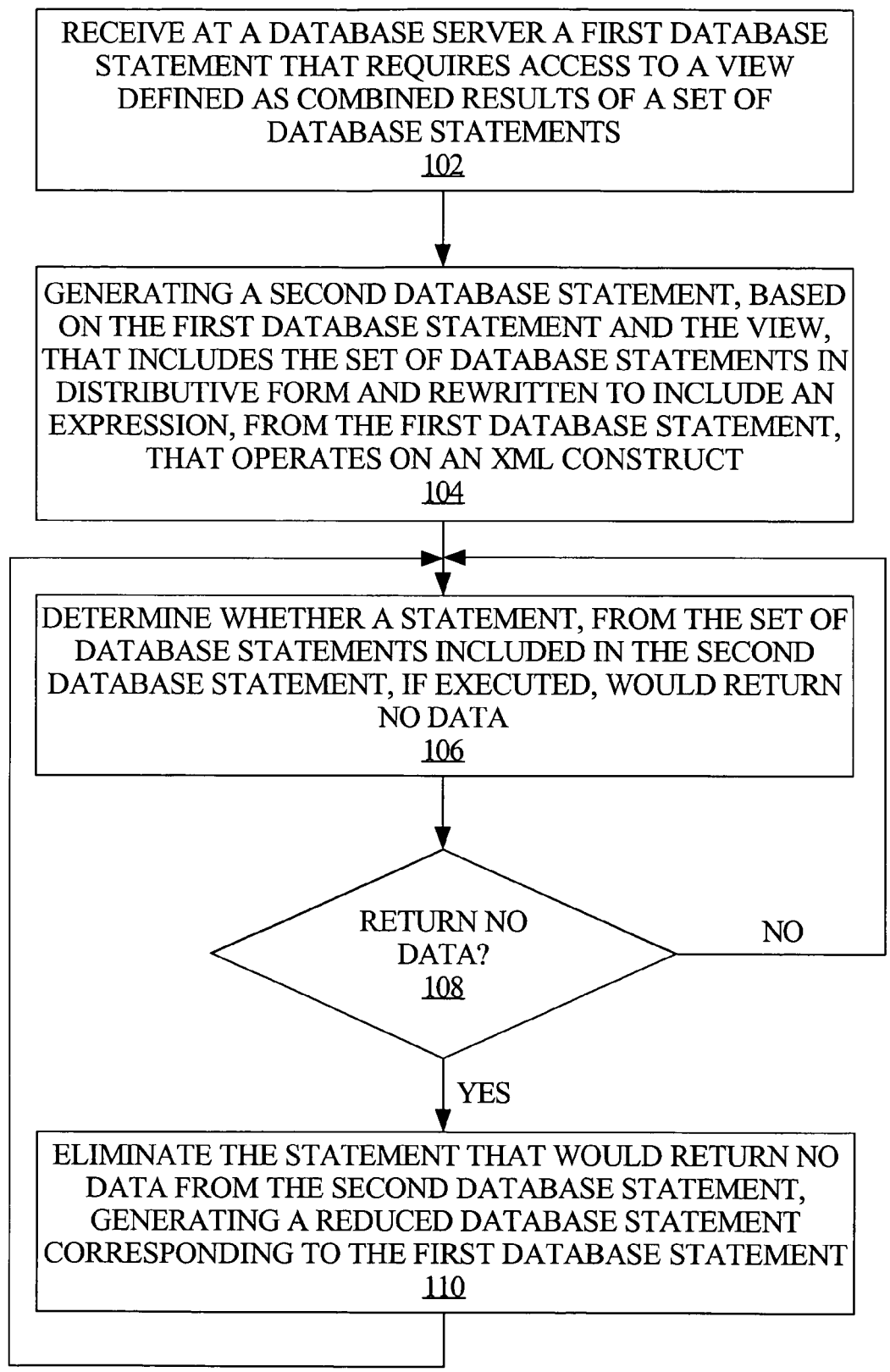
FIG. 1 is a flow diagram that illustrates a method for rewriting a database statement, such as an XML query over a UNION ALL view, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview of Embodiments

According to one aspect of the invention, elimination-based optimization is provided for database statements (e.g., queries) involving XML data, such as XPath and XQuery, which operate over views that use aggregate set operators, such as UNION ALL. Such queries are optimized, in part, using the structural information pertaining to the base data containers (e.g., relational data tables, or views) underlying the view. The structural information pertaining to the underlying data containers may be, for example, XML Schema information, the structure of the XML operators in the XML view, the object structure of the underlying object table or view, or other structural information.

According to an embodiment, as part of a "view merge" stage of query transformation, the query that operates over the view is merged with a query that defines the view. That is, the query that operates over the view is transformed so that an operator in the top-level query operates over the database statements that define the view. According to another embodiment, one or more expressions (e.g., operators, predicates, virtual table constructs) from the query that operates over the view and/or from the query that defines the view are "pushed down" to operate on the individual underlying data containers that are separated in the view statement by the set operators. That is, the query that operates over the view is further transformed so that the expressions are included in each of a set of sub-queries that make up the transformed query, where each sub-query corresponds to one of the underlying data containers on which the view is based. In other words, the query that operates over the view is transformed to a distributive form, based in part on the query that defines the view.

According to another embodiment, "branch elimination" is performed based on the structure of the view as well as the query acting over the view, based on which it is possible to determine whether or not any of the sub-queries (i.e., "branches") result in the return of zero rows. If any of the branches, if executed, would return zero rows, then such branches are eliminated from the transformed query, leaving a reduced set of data containers on which to execute the query.

In certain circumstances, the transformed query can be rewritten into a relational or object-relational equivalent. Based on the rewritten query, the individual sub-queries may be executed on the underlying tables or views, for which efficient access paths may be utilized.

Operating Environment

The techniques described herein are described in the general context of a database system. A database system typically comprises one or more clients that are communicatively coupled to a server that is connected to a shared database. "Server" may refer collectively to a cluster of server instances and machines on which the instances execute. Generally, a server is combination of integrated software components and an allocation of computational resources, such as memory, a node, and processes on the node for executing the integrated software components on a processor, where the combination of the software and computational resources are dedicated to providing a particular type of function on behalf of clients of the server. Among other functions of database management, a database server governs and facilitates access to a particular database, processing requests by clients to access the database.

A database comprises data and metadata that is stored on a persistent memory mechanism, such as a set of hard disks. Such data and metadata may be stored in a database logically, for example, according to relational database constructs. Database applications interact with a database server by submitting to the database server commands that cause the database server to perform operations on data stored in a database. A database command that is sent from a database application to a database server contains an original statement of the database command. For the database server to process the commands, the commands must conform to a database language supported by the database server. One database language supported by many database servers is known as the Structured Query Language (SQL).

Combining XML Data

Modern database systems may be configured to natively support the storage and management of XML data based on XML constructs, using relational constructs, object-relational constructs, and the like. XML constructs include XML elements, XML attributes, XML documents (which always have a single root element), and document fragments that include multiple elements at the root level; object relational constructs include such constructs as tables, rows, columns, objects and views. There are mechanisms for mapping XML constructs in an XML schema to constructs in an object-relational and mechanisms for storing XML content into the appropriated object-relational construct. One or more object-relational constructs that correspond to all or part of an XML construct are associated with an XML type. These mechanisms support various options for storing the XML type, from storing the entire document as a single featureless large object in the database (e.g., a character large object, CLOB) to storing one or more XML elements as one or more simple or object type columns or collections in one or more tables.

Furthermore, XML data may be combined using various set operators. Native XMLType data, as a logical abstract data type, by its nature lends itself to unions. This is in contrast to relational data, for which data types must match in order to union such data. Hence, lots of XML data having different structural and storage characteristics can readily be grouped together, from which conventional optimizations may be taken advantages of. Set operators such as UNION ALL, aggregate, or combine, data. Set operators may be used to combine XML data in various scenarios and associated embodiments, which include the following:

Heterogeneous schemas: a set of tables of XMLType (or some other similar XML data type that is natively supported by a database server) with heterogeneous structure may be aggregated using set operators. The structure of the tables may have limited or no correspondence to each other.

Homogeneous schemas: a set of tables of XMLType with similar structure may be aggregated using set operators. The structure of the tables may vary in certain aspects of the structural information. For example, the data in the table might pertain to schemas that differ in terms of substitution group information. As another example, the data in the table might pertain to objects linked by an inheritance hierarchy.

Distributed XML: a set of tables of XMLType distributed over a set of nodes (such as a set of machines communicatively coupled via the Internet) may be aggregated using set operators, where the XML data in the tables may be served by distributed database servers.

Schema evolution: an important scenario under which UNION ALL queries may be written is for schema evolution. A set of tables corresponding to different XML schemas might correspond to an XML schema document as it changed, or evolved, via "schema evolution." Under schema evolution, parts of the schema may have evolved while other parts remained substantially the same. Tables are created to store XML data conforming to the schema, based on each schema version. In order to view the data as a single view, the data from the different tables is combined with a UNION ALL operator to obtain a uniform view of the XML data. Thus, under scenarios in which schemas are dynamic and undergo schema evolution, combining XML data conforming to different schema versions via database statements containing UNION ALL set operators is beneficial. Furthermore, execution of database statements that involve such a view can benefit from optimizations, as described in greater detail hereafter.

Storage unification: an important scenario under which UNION ALL queries may be written is for XML data storage unification. Some "legacy" database systems may generate XML data from relational data while "physically" storing XML data natively in a set of relational tables. For example, XML data may be generated to correspond to older relational data, via an XML view (e.g., using SQL/XML operators such as XMLElement( ) and XMLAgg( )), while newer XML data is stored in the system as a native data type (e.g., XMLType data) in relational, object-relational, or object tables. In order to view the data as a single view, the data from the different tables is combined with a UNION ALL operator to obtain a uniform view of the XML data. Furthermore, XML data stored according to any combination of the aforementioned storage models can be combined into a single view using the UNION ALL operators. Thus, under scenarios in which a mix of relational data and native type XML data are stored, combining XML data conforming to different storage models via database statements containing UNION ALL set operators is beneficial. Furthermore, execution of database statements that involve such a view can benefit from optimizations, as described in greater detail hereafter.

Rewriting XML Queries Directed to Relational Constructs

Consider the following example of a database statement that defines a view, named RecentOrders, with a set of database statements (e.g., sub-queries). In this example, the XML data in tables PurchaseOrder_Tab and SaleOrder_Tab conform to different schemas. Thus, the view RecentOrders has been used to union XML data in tables corresponding to different schemas.

CREATE OR REPLACE VIEW RecentOrders AS
    SELECT value(p)
    FROM PurchaseOrder_Tab p
    WHERE extractvalue(value(p), '/PurchaseOrder/OrderHeader/Date')>'31 Dec. 1995'
    UNION ALL
    SELECT value(p)
    FROM SaleOrder_Tab p
    WHERE extractvalue(value(p), '/SaleOrder/OrderHeader/Date')>'31 Dec. 1995'
    UNION ALL
    SELECT value(p)
    FROM ExchangeOrder_Tab p
    WHERE extractvalue(value(p), '/ExchangeOrder/OrderHeader/Date')>'31 Dec. 1995'.

Consider the following query, referred to as "Query Q1", executed over the view RecentOrders. The query returns the maximum percentage tax recorded in a state outside California.

SELECT MAX(extractvalue(value(p), 'SaleOrder/OrderHeader/Tax')/extractvalue (value(p), 'SaleOrder/OrderHeader/Amount'))
    FROM RecentOrders p
    WHERE extractvalue(value(p), '/SaleOrder/OrderHeader/State')!='CA'.

The foregoing query, which contains an XML component operation (extractvalue( )) that operates on an XML data construct that is based on one or more relational database constructs, can be rewritten into the following query that operates on underlying relational database constructs (e.g., tables and/or views):

SELECT MAX(p.xmldata.orderheader.tax/p.xmldata.orderheader/amount)
    FROM SALEOrder_Tab p
    WHERE p.xmldata.orderheader.date>'1 Jan. 1999' AND p.xmldata.orderheader.state!='CA'.

Because the rewritten query is now directed to the underlying relational database constructs, execution of such a query may utilize efficient access paths for evaluation of the underlying tables, which is performed in accordance with regular query optimization, such as by a traditional database query optimizer. Some techniques for rewriting XML queries directed to relational database constructs are described in the Query Rewrite references. The techniques disclosed in the Query Rewrite references may be used in conjunction with the embodiments described herein, but use of the Query Rewrite techniques with the embodiments described herein is not required.

Transforming XML Queries Over XML Union all Views

Techniques for optimizing queries over XML views that use UNION ALL involve the following query transformation stages, each of which is described in greater detail herein: (1) "view merge"; (2) "expression push down"; and (3) "branch elimination." XML views that use the UNION ALL operator are referred to herein as "UNION ALL views". UNION ALL views are typically defined as the combined results of a set of database statements, i.e., a database query (e.g., an SQL query) containing sub-queries that are inter-related via one or both of the UNION ALL operators, as illustrated in the foregoing CREATE VIEW statement for the view RecentOrders. Each of the three foregoing stages can represent a separate embodiment of the invention, and transforms an original query over an XML UNION ALL view so that ultimately executing the transformed query involves a more computationally efficient set of operations than executing the original query in its original form.

With past approaches to executing queries over UNION ALL views, functional evaluation of the underlying data containers was required. That is, prior executions of the UNION ALL view would require, for example, formulating the UNIONs by generating all the rows from the UNION ALL operations in one or more temporary tables and applying the XML component operations (e.g., extractvalue( ) and existnode( )), etc. Hence, for every row of every underlying XML data container, the XML component operations would be performed.

View Merge

During the view merge stage, the query that operates over the view is merged with the query that defines the view. That is, the query that operates over the UNION ALL view is transformed so that an operator in the top-level query operates on the database statements that define the view. In other words, the query that operates over the UNION ALL view is transformed so that an operator in the top-level query operates on the underlying data containers (e.g., tables and/or views) with which the UNION ALL view is defined. For example, Query Q1 is rewritten, or transformed, into a query of the following form, referred to as "Query Q2".

SELECT MAX(extractvalue(value(p), 'SaleOrder/OrderHeader/Tax')/extractvalue(value(p), 'SaleOrder/OrderHeader/Amount') )
FROM
(
SELECT value(p)
FROM PurchaseOrder_Tab p
WHERE extractvalue(value(p), '/PurchaseOrder/OrderHeader/Date') > '31-DEC-95'
UNION ALL
SELECT value(p)
FROM SaleOrder_Tab p
WHERE extractvalue(value(p), '/SaleOrder/OrderHeader/Date') > '31-DEC-95'
UNION ALL
SELECT value(p)
FROM ExchangeOrder_Tab p
WHERE extractvalue(value(p), '/ExchangeOrder/OrderHeader/Date') > '31-DEC-95'
)
WHERE extractvalue(value(p), '/SaleOrder/OrderHeader/State') != 'CA'.

Thus, Query Q1 is transformed so that the aggregation operator MAX now operates on the database statements and, therefore, the underlying tables with which the UNION ALL view is defined.

Expression Pushdown

An SQL/XML query may include XPath based operations such as EXTRACT, EXISTNODE, and EXTRACTVALUE, which operate on a portion of an XML construct indicated by an XPath expression provided as an argument to the operator. EXISTNODE returns one value (e.g., 0) if there is no XML element at the position in the hierarchy indicated by the XPath expression, and a different value (e.g., 1) otherwise. EXTRACT returns a data stream representing a portion of the XML construct at nodes in the hierarchy of the XML construct that include and descend from the XML element or elements indicated by the XPath expression. EXTRACTVALUE returns a scalar value, if any, from the XML element indicated by the XPath expression.

During the expression pushdown stage, one or more expressions (e.g., operators, predicates, virtual table constructs) from the query that operates over the UNION ALL view and/or from the query that defines the UNION ALL view are "pushed down" to operate on the individual underlying XML data constructs which were separated in the view statement by the UNION ALL set operators. Hence, the query that operates over the view is further transformed so that the expressions are included in each of a set of sub-queries that make up the transformed query, where each sub-query corresponds to one of the underlying data containers on which the view is based. In other words, the query that operates over the view is effectively transformed to a distributive form, based in part on the UNION ALL view query.

For example, Query Q2 is rewritten, or transformed, into a query of the following form, referred to as "Query Q3".

```
SELECT MAX(e)
FROM
(
(
SELECT MAX(extractvalue(value(p), 'SaleOrder/OrderHeader/Tax')/
extractvalue(value(p), 'SaleOrder/OrderHeader/Amount') )
FROM PurchaseOrder_Tab p
WHERE extractvalue(value(p), '/PurchaseOrder/OrderHeader/Date') >
'31-DEC-95'
    AND
extractvalue(value(p), '/SaleOrder/OrderHeader/State') != 'CA'
)
UNION ALL
(
SELECT MAX(extractvalue(value(p), 'SaleOrder/OrderHeader/Tax')/
extractvalue(value(p), 'SaleOrder/OrderHeader/Amount')
FROM SaleOrder_Tab p
WHERE extractvalue(value(p), '/SaleOrder/OrderHeader/Date') >
'31-DEC-95'
    AND
extractvalue(value(p), '/SaleOrder/OrderHeader/State') != 'CA')
)
UNION ALL
(
SELECT MAX(extractvalue(value(p), 'SaleOrder/OrderHeader/Tax')/
extractvalue(value(p), 'SaleOrder/OrderHeader/Amount') )
FROM ExchangeOrder_Tab p
WHERE extractvalue(value(p), '/ExchangeOrder/OrderHeader/Date') >
'31-DEC-95'
    AND
extractvalue(value(p), '/SaleOrder/OrderHeader/State') != 'CA'
)
) e
```

In this example, the operator (1) MAX(extractvalue(value(p), 'SaleOrder/OrderHeader/Tax')/ extractvalue(value(p), 'SaleOrder/OrderHeader/Amount'); and the predicate (2) extractvalue(value(p), '/SaleOrder/OrderHeader/State') !='CA') are all "pushed down" to operate on the individual underlying XML data containers. Furthermore, a top-level MAX operator is added, to compute the maximum of the three MAX operators.

After the expression pushdown stage of the query transformation process, the original query is optimized to some extent because each individual branch or sub-query can now be rewritten and optimized according to the Query Rewrite references. For example, each query branch can be rewritten and a corresponding execution plan be implemented to use efficient access paths (e.g., index lookups) on the underlying tables. Alternatively, the transformed query can be further optimized using branch elimination, as follows.

Branch Elimination

During the branch elimination stage, the structure of the UNION ALL view as well as the query acting over the view is analyzed to determine whether or not any of the sub-queries (i.e., "branches") would, if executed, result in the return of zero rows. If any of the branches, if executed, would return zero rows, then such branches are eliminated from the transformed query, leaving a reduced set of data containers on which to execute the query.

For instance, in Query 3, execution of the first and the third branches would produce no rows in the results. Such a determination is made based on the structure of the underlying XML constructs to which the branch is directed. In this example, in the FROM clause of the first branch of the transformed query, the enclosing tag of the underlying XML data is PurchaseOrder. Based on the XML query, '/SaleOrder/OrderHeader/Tax', in the WHERE clause, it is known at query compile time that the branch would not return any rows because part of the conjunctive predicate is directed to a different data container than the FROM clause. Similarly, in the FROM clause of the third branch of the transformed query, the enclosing tag of the underlying XML data is ExchangeOrder. Based on the XML query, '/SaleOrder/OrderHeader/Tax', in the WHERE clause, it is known at compile time that the branch would not return any rows. Hence, these branches can be removed from the transformed query and, therefore, removed from further processing.

According to one embodiment, the determination of whether a branch is known to return zero rows is performed using an XML Input analysis phase of a query (e.g., XPath and/or XQuery) rewrite process. During the XML Input analysis phase, some compile time analysis is performed on the meta-data input structure of the XML Input and on the XPath/XQuery to determine whether the result value of the XPath/XQuery does not mach any nodes or returns an empty sequence. For example, if the XML Input schema indicates that there is no element 'OrderHeader' until the element 'Sale', then '/SaleOrder/OrderHeader/Tax' should not match any element nodes 'OrderHeader' under element node 'SaleOrder'. Therefore, the XML Input analysis finds a non-matching situation and eliminates the branch that contains this XPath.

Thus, branch elimination transforms Query Q3 into the following query, referred to as "Query Q4".

```
SELECT MAX(extractvalue(value(p), 'SaleOrder/Order-
    Header/Tax')/extractvalue(value(p), 'SaleOrder/Order-
    Header/Amount'))
FROM SaleOrder_Tab p
WHERE  extractvalue(value(p),   '/SaleOrder/Order-
    Header/Date')>'31 Dec. 1995'
AND  extractvalue(value(p),  '/SaleOrder/OrderHeader/
    State')!='CA'
```

Furthermore, the query can be rewritten in certain circumstances (as discussed in the Query Rewrite references). For instance, Query Q4 can be rewritten so that it is a query on the underlying object-relational columns, for which more efficient evaluation is available, as follows.

SELECT    MAX(p.xmldata.orderheader.tax/p.xmldata.orderheader/amount)
FROM SALE_ORDERS_xmltype p
WHERE  p.xmldata.orderheader.date>'31 Dec. 1995'
    AND p.xmldata.orderheader.state!='CA'

The query transformation techniques described herein offer useful performance advantages by allowing for faster computation of the query while utilizing fewer computer and network resources.

A Method for Rewriting a Database Statement

FIG. 1 is a flow diagram that illustrates a method for rewriting a database statement, such as an XML query over a UNION ALL view, according to an embodiment of the invention. The process illustrated in FIG. 1 is implemented for automated performance by a conventional computing system, such as computer system 200 of FIG. 2.

At block 102, a database server receives a first database statement, or query, that requires access to a UNION ALL view, i.e., a view defined as a combination of results of a set of database statements, or sub-queries. In other words, a query over a UNION ALL view is received at a database server. Furthermore, the first database statement includes an expression that operates on an XML construct. For non-limiting examples, the first database statement, or query, may include the following types of expressions:

an operator (e.g., SELECT MAX(extractvalue(value(p), 'SaleOrder/OrderHeader/Tax')/ extractvalue(value(p), 'SaleOrder/OrderHeader/Amount')) from Query Q1); and/or a predicate (e.g., WHERE extractvalue(value(p), '/SaleOrder/OrderHeader/State')!='CA' from Query Q1); and/or a virtual table construct (e.g., FROM XMLTable('/SaleOrder/OrderHeader/State')).

At block 104, a second database statement, or query, is generated based on the first database statement and on the view. The second database statement includes the set of database statements in distributive form and rewritten to include the expression, from the first database statement, that operates on the XML construct. Generating the second database statement involves the view merge stage to include the set of database statements in distributive form, and involves the expression pushdown stage to include the expression.

At block 106, it is determined whether a statement, from the set of database statements included in the second database statement, would return no results (i.e., no data) if executed. For example, each branch of the transformed database statement is analyzed to determine whether or not it would return data based on the structure of the underlying data constructs to which the respective branch is directed. Determining whether or not a statement would produce zero rows involves the branch elimination stage.

If, at decision block 108, the statement currently being analyzed would return data if executed, then control returns to block 106 to analyze the next statement branch, or sub-query, of the second database statement. If there are no more statement branches to analyze, then the query transformation process is completed. Thus, the resulting second database statement can be rewritten to operate on the underlying relational or object-relational constructs, for example, through use of techniques described in the Query Rewrite references, and then the expression(s) can be evaluated against the underlying data constructs on which the view is based.

If, at decision block 108, the statement currently being analyzed would not return any data, then control passes to block 110. At block 110, the statement that would return no data is eliminated from the second database statement, thereby generating a reduced database statement that corresponds to the original first database statement. Control can then return to block 106 to analyze the next statement branch, or sub-query, of the second database statement. If there are no more statement branches to analyze, then the query transformation process is completed. Thus, the resulting reduced database statement can be rewritten to operate on the underlying relational or object-relational constructs, for example, through use of techniques described in the Query Rewrite references, and then the expression(s) can be evaluated against the underlying data constructs on which the view is based.

Hardware Overview

Figure 2:
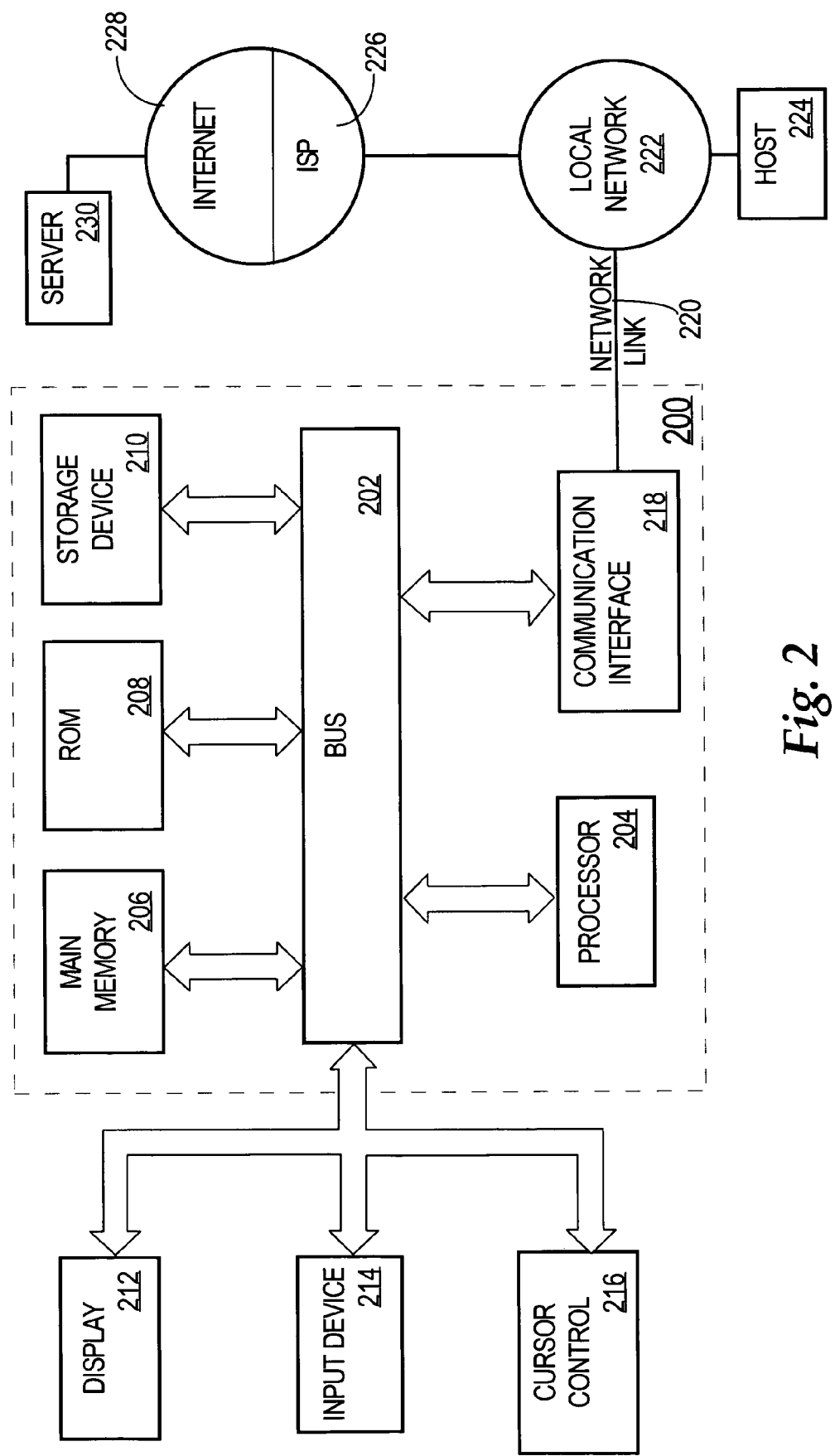
FIG. 2 is a block diagram that illustrates a computer system upon which an embodiment of the invention may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another machine-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 200, various machine-readable media are involved, for example, in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   a database server running on one or more computers;
   said database server receiving a first database statement;
   wherein the first database statement requires access to a view defined as combined results of a set of database statements;
   wherein the first database statement includes an expression that operates on an XML construct; and
   said database server generating a second database statement, based on the first database statement and the view, that includes a modified version of the set of database statements in the distributive form and rewritten to include the expression that operates on the XML construct.

2. The method of claim 1, further comprising:
   determining whether any statement, from the set of database statements included in the second database statement, if executed, would return no data; and
   for any statement that would return no data, eliminating the statement from the second database statement, generating a reduced database statement corresponding to the first database statement.

3. The method of claim 2, further comprising:
   rewriting each expression, included in the set of database statements from the reduced database statement, as a particular relational database expression that does not include the corresponding expression that operates on the XML construct.

4. A volatile or non-volatile machine-readable storage medium storing one or more sequences of instructions which, when executed by one or more processors, causes the one or more processors to perform the method recited in claim 3.

5. A volatile or non-volatile machine-readable storage medium storing one or more sequences of instructions which, when executed by one or more processors, causes the one or more processors to perform the method recited in claim 2.

6. The method of claim 1, wherein the view is an XML data view that is based on one or more UNION ALL operations on database statements from the set of database statements.

7. A volatile or non-volatile machine-readable storage medium storing one or more sequences of instructions which, when executed by one or more processors, causes the one or more processors to perform the method recited in claim 6.

8. The method of claim 1, wherein the expression that operates on the XML construct is an XML-specific operator.

9. A volatile or non-volatile machine-readable storage medium storing one or more sequences of instructions which, when executed by one or more processors, causes the one or more processors to perform the method recited in claim 8.

10. The method of claim 1, wherein the expression that operates on the XML construct is an XML-specific predicate.

11. A volatile or non-volatile machine-readable storage medium storing one or more sequences of instructions which, when executed by one or more processors, causes the one or more processors to perform the method recited in claim 10.

12. The method of claim 1, wherein the expression that operates on the XML construct is an XML aggregation operator.

13. A volatile or non-volatile machine-readable storage medium storing one or more sequences of instructions which, when executed by one or more processors, causes the one or more processors to perform the method recited in claim 12.

14. The method of claim 1, wherein the expression that operates on the XML construct is an XMLTable virtual table construct.

15. A volatile or non-volatile machine-readable storage medium storing one or more sequences of instructions which, when executed by one or more processors, causes the one or more processors to perform the method recited in claim 14.

16. A volatile or non-volatile machine-readable storage medium storing one or more sequences of instructions which, when executed by one or more processors, causes the one or more processors to perform the method recited in claim 1.

17. The method of claim 1, wherein the XML construct includes one or more XML elements, XML attributes, XML documents, or XML document fragments that are indicated by a path that is provided as an argument to the expression.

18. A volatile or non-volatile machine-readable storage medium storing one or more sequences of instructions which, when executed by one or more processors, causes the one or more processors to perform the method recited in claim 17.

19. The method of claim 1, wherein the expression is an XML component operation.

20. A volatile or non-volatile machine-readable storage medium storing one or more sequences of instructions which, when executed by one or more processors, causes the one or more processors to perform the method recited in claim 19.

21. The method of claim 1, further comprising:
determining whether any statement, from the set of database statements included in the second database statement, is not in the XML construct; and
for any statement that is not in the XML construct, eliminating the statement from the second database statement, generating a reduced database statement corresponding to the first database statement.

22. A volatile or non-volatile machine-readable storage medium storing one or more sequences of instructions which, when executed by one or more processors, causes the one or more processors to perform the method recited in claim 21.

23. A method comprising:
a database server running on one or more computers;
said database server creating a first database statement that defines a view based on first and second XML data, wherein the first XML data is based on a first version of an XML schema and the second XML data is based on a second version of the XML schema, and wherein the second version of the XML schema describes a different data structure than the first version of the XML schema;
wherein the first database statement includes a union, based on a UNION ALL operator, of a statement involving the first XML data and a statement involving the second XML data; and
in response to receiving a second database statement that involves the view, executing the first database statement by said database server.

24. A volatile or non-volatile machine-readable storage medium storing one or more sequences of instructions which, when executed by one or more processors, causes the one or more processors to perform the method recited in claim 23.

25. A method comprising:
a database server running on one or more computers;
said database server creating a first database statement that defines a view based on first and second XML data, wherein the first XML data is stored in a database based on a first data storage model and the second XML data is stored in the database based on a second data storage model, and wherein the second data storage model is different than the first data storage model;
wherein the first database statement includes a union, based on a UNION ALL operator, of a statement involving the first XML data and a statement involving the second XML data; and
in response to receiving a second database statement that involves the view, executing the first database statement by said database server.

26. The method of claim 23, wherein the first data storage model and the second data storage model are each from a group consisting of a CLOB (Character Large Object), an XML view based on relationally-stored data, and a native XML data type.

27. A volatile or non-volatile machine-readable storage medium storing one or more sequences of instructions which, when executed by one or more processors, causes the one or more processors to perform the method recited in claim 26.

28. A volatile or non-volatile machine-readable storage medium storing one or more sequences of instructions which, when executed by one or more processors, causes the one or more processors to perform the method recited in claim 25.

29. A method comprising:
a first database server running on one or more computers;
said first database server creating a first database statement that defines a view based on first and second XML data, wherein the first XML data is managed by said first database server and the second XML data is managed by a second database server, and wherein the second database server is a different server than the first database server;
wherein the first database statement includes a union, based on a UNION ALL operator, of a statement involving the first XML data and a statement involving the second XML data; and
in response to receiving a second database statement that involves the view, executing the first database statement by said first database server.

30. A volatile or non-volatile machine-readable storage medium storing one or more sequences of instructions which, when executed by one or more processors, causes the one or more processors to perform the method recited in claim 29.

31. A method comprising:
a first database server running on one or more computers;
said first database server creating a first database statement that defines a view based on first and second XML data;
wherein the first XML data and the second XML data are based on a combination of any two from a group consisting of:

(a) the first XML data is managed by said first database server and the second XML data is managed by a second database server, wherein the second database server is a different server than the first database server, (b) the first XML data is stored in a database based on a first data storage model and the second XML data is stored in the database based on a second data storage model, wherein the second data storage model is different than the first data storage model, (c) the first XML data conforms to a first version of an XML schema and the second XML data conforms to a second version of the XML schema, wherein the second version of the XML schema describes a different data structure than the first version of the XML schema;

wherein the first database statement includes a union, based on a UNION ALL operator, of a statement involving the first XML data and a statement involving the second XML data; and in response to receiving a second database statement that involves the view, executing the first database statement by said first database server.

32. A volatile or non-volatile machine-readable storage medium storing one or more sequences of instructions which, when executed by one or more processors, causes the one or more processors to perform the method recited in claim 31.

33. A method comprising:

a database server running on one or more computers;

said database server creating a first database statement that defines a view based on first and second XML data, wherein the first XML data is based on a first XML schema and the second XML data is based on a second XML schema, and wherein the second XML schema describes a different data structure than the first XML schema;

wherein the first database statement includes a union, based on a UNION ALL operator, of a statement involving the first XML data and a statement involving the second XML data; and in response to receiving a second database statement that involves the view, executing the first database statement by said database server.

34. A volatile or non-volatile machine-readable storage medium storing one or more sequences of instructions which, when executed by one or more processors, causes the one or more processors to perform the method recited in claim 33.

35. A method comprising:

a database server running on one or more computers;

said database server receiving a first database statement;

wherein the first database statement requires access to a view defined as combined results of a set of database statements;

wherein the first database statement includes an expression that operates on an XML construct that is based on a relational database construct; and said database server generating a second database statement, based on the first database statement and the view, that includes a modified version of the set of database statements in the distributive form and rewritten to operate on the relational database construct.

36. The method of claim 35, wherein the relational database construct includes one or more tables, rows, columns, objects, and views that are indicated by a reference to the relational database construct in the second database statement.

37. A volatile or non-volatile machine-readable storage medium storing one or more sequences of instructions which, when executed by one or more processors, causes the one or more processors to perform the method recited in claim 36.

38. A volatile or non-volatile machine-readable storage medium storing one or more sequences of instructions which, when executed by one or more processors, causes the one or more processors to perform the method recited in claim 35.

* * * * *

UNITED STATES PATENT AND TRADEMARK OFFICE
CERTIFICATE OF CORRECTION

PATENT NO.        : 7,685,150 B2
APPLICATION NO.   : 11/237286
DATED             : March 23, 2010
INVENTOR(S)       : Anand Manikutty et al.

It is certified that error appears in the above-identified patent and that said Letters Patent is hereby corrected as shown below:

In Face page, in field (56), under "Other Publications" column 2, line 16, Delete "-xmischema-" and insert -- -xmlschema- --, therefor.

In column 1, line 38, delete "of." and insert -- of --, therefor.

In column 1, line 51, delete "XML-ized" and insert -- XML-sized --, therefor.

In column 3, line 18, delete "such." and insert -- such --, therefor.

In column 5, line 35, delete "QI"," and insert -- Q1", --, therefor.

In column 14, line 28, in Claim 26, delete "claim 23," and insert -- claim 25, --, therefor.

Signed and Sealed this
First Day of March, 2011

David J. Kappos
*Director of the United States Patent and Trademark Office*